United States Patent
Sugawara et al.

(10) Patent No.: US 6,524,691 B2
(45) Date of Patent: Feb. 25, 2003

(54) SOUND ABSORBING-INSULATING STRUCTURE FOR VEHICLES

(75) Inventors: Hiroshi Sugawara, Kanagawa-ken (JP); Takayuki Fukui, Kanagawa-ken (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 09/908,912

(22) Filed: Jul. 20, 2001

(65) Prior Publication Data

US 2002/0025421 A1 Feb. 28, 2002

(30) Foreign Application Priority Data

Aug. 25, 2000 (JP) .......................................... 2000-255234

(51) Int. Cl.[7] .................................................. D21J 1/00
(52) U.S. Cl. ................. 428/292.4; 428/219; 428/317.1; 428/317.9; 181/286; 181/290; 181/294
(58) Field of Search ................................. 428/286, 287, 428/317.9, 319.7, 317.7, 317.1, 219, 224, 284, 292.4, 297.4, 300.7, 311.71; 181/294, 286, 290, 224

(56) References Cited

U.S. PATENT DOCUMENTS

| | | | |
|---|---|---|---|
| 5,049,439 A | * | 9/1991 | Robinson .................... 428/286 |
| 5,286,929 A | | 2/1994 | Kazama et al. .............. 181/286 |
| 5,554,831 A | | 9/1996 | Matsukawa et al. |
| 5,817,408 A | | 10/1998 | Orimo et al. |
| 5,883,025 A | | 3/1999 | Karstens et al. |
| 6,010,870 A | * | 1/2000 | Pelzer et al. .................. 435/41 |

FOREIGN PATENT DOCUMENTS

| | | |
|---|---|---|
| DE | 41 28 927 A1 | 3/1993 |
| EP | 0 083 435 A2 | 7/1983 |
| EP | 0 909 680 A1 | 4/1999 |
| GB | 2 005 191 A | 4/1979 |
| JP | 5-181486 | 7/1993 |
| JP | 6-170997 | 6/1994 |
| JP | 7-223478 | 8/1995 |

OTHER PUBLICATIONS

European Search Report, Jun. 12, 2002.

* cited by examiner

Primary Examiner—Merrick Dixon
(74) Attorney, Agent, or Firm—Foley & Lardner (57) ABSTRACT

A sound absorbing-insulating structure for vehicles includes a sound absorbing layer which contains cellulose fibers containing cotton yarns, pulp fibers, etc. and synthetic resin as principle components. The sound absorbing-insulating structure for vehicles, in which a content rate of the synthetic resin is in the range of 0.01 to 80 wt %, and a surface density is in the range of 0.2 to 3 kg/m$^2$, is provided. This sound absorbing-insulating structure has a good sound absorbing-characteristic and is light in weight and inexpensive in cost.

17 Claims, 7 Drawing Sheets

| | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Natural fiber | Pulp | 99.9 | 20 | 99.9 | 20 | 99.9 | 20 | 99.9 | 20 | 99.9 | 20 |
| | Regenerated pulp | — | — | — | — | — | — | — | — | — | — |
| | Cotton yarn | — | — | — | — | — | — | — | — | — | — |
| Synthetic resin | PE powder | 0.01 | 80 | — | — | — | — | — | — | — | — |
| | PP fiber | — | — | 0.01 | — | 0.01 | 80 | — | — | — | — |
| | PET fiber | — | — | — | — | — | — | 0.01 | 80 | — | — |
| | PET/PEI fiber | — | — | — | — | — | — | — | — | 0.01 | 80 |
| Surface density (kg/cm²) | | 0.2 | 0.2 | 3.0 | 3.0 | 0.2 | 0.2 | 3.0 | 3.0 | 0.2 | 0.2 |
| Sound absorbing characteristic | 500Hz | 0.128 | 0.121 | 0.189 | 0.194 | 0.162 | 0.165 | 0.201 | 0.198 | 0.178 | 0.172 |
| | 1kHz | 0.256 | 0.266 | 0.592 | 0.601 | 0.289 | 0.298 | 0.614 | 0.613 | 0.316 | 0.302 |
| Sound insulating characteristic (average dB) | ~500Hz | 1.3 | 1.5 | 2.0 | 2.1 | 1.6 | 1.9 | 2.3 | 2.1 | 1.8 | 2.0 |
| | 500Hz~ | 2.0 | 2.1 | 2.9 | 3.0 | 2.3 | 2.4 | 3.1 | 3.2 | 2.5 | 2.6 |

| | | Example 11 | Example 12 | Example 13 | Example 14 | Example 15 | Example 16 | Example 17 | Example 18 | Example 19 |
|---|---|---|---|---|---|---|---|---|---|---|
| Natural fiber | Pulp | 99.9 | 20 | — | — | — | — | — | — | — |
| | Regenerated pulp | — | — | 99.9 | 20 | 99.9 | 20 | 20 | 20 | 20 |
| | Cotton yarn | — | — | — | — | — | — | 60 | 60 | 30 |
| Synthetic resin | PE powder | — | — | — | — | — | — | — | — | — |
| | PP fiber | — | — | — | — | — | — | — | — | — |
| | PET fiber | — | — | — | — | — | — | — | — | 30 |
| | PET/PEI fiber | 0.01 | 80 | 0.01 | 80 | 0.01 | 80 | 20 | 20 | 20 |
| Surface density (kg/cm²) | | 3.0 | 0.2 | 3.0 | 0.2 | 3.0 | 0.2 | 1.0 | 1.0 | 1.0 |
| Sound absorbing characteristic | 500Hz | 0.218 | 0.2 | 0.218 | 0.172 | 0.218 | 0.2 | 0.185 | 0.185 | 0.185 |
| | 1kHz | 0.632 | 0.621 | 0.632 | 0.302 | 0.632 | 0.621 | 0.633 | 0.633 | 0.633 |
| Sound insulating characteristic (average dB) | ~500Hz | 2.3 | 2.3 | 2.3 | 2.0 | 2.3 | 2.3 | 2.2 | 2.2 | 2.2 |
| | 500Hz~ | 3.1 | 3.0 | 3.1 | 2.6 | 3.1 | 3.0 | 2.8 | 2.8 | 2.8 |

FIG.7

| | | Comparative example 1 | Comparative example 2 | Comparative example 3 | Comparative example 4 | Comparative example 5 |
|---|---|---|---|---|---|---|
| Natural fiber | Pulp | 100 | 10 | 100 | 10 | 10 |
| | Regenerated pulp | — | — | — | — | — |
| Synthetic resin | PE powder | 0 | 90 | 0 | 90 | — |
| | PP fiber | — | — | — | — | 90 |
| | PET / PEI fiber | — | — | — | — | — |
| Surface density (kg/cm²) | | 0.2 | 0.2 | 3.0 | 3.0 | 0.2 |
| Sound absorbing characteristic | 500Hz | — | 0.12 | — | 0.194 | 0.166 |
| | 1kHz | — | 0.267 | — | 0.609 | 0.3 |
| Sound insulating characteristic (average dB) | ~500Hz | — | 1.4 | — | 2.1 | 2.0 |
| | 500Hz~ | — | 2.1 | — | 2.9 | 2.5 |

| | | Comparative example 6 | Comparative example 7 | Comparative example 8 | Comparative example 9 | Comparative example 10 |
|---|---|---|---|---|---|---|
| Natural fiber | Pulp | 10 | 10 | 10 | — | — |
| | Regenerated pulp | — | — | — | 10 | 10 |
| Synthetic resin | PE powder | — | — | — | — | — |
| | PP fiber | 90 | 90 | 90 | 90 | 90 |
| | PET / PEI fiber | — | — | — | — | — |
| Surface density (kg/cm²) | | 3.0 | 0.2 | 3.0 | 0.2 | 3.0 |
| Sound absorbing characteristic | 500Hz | 0.2 | 0.18 | 0.21 | 0.18 | 0.21 |
| | 1kHz | 0.611 | 0.303 | 0.618 | 0.303 | 0.618 |
| Sound insulating characteristic (average dB) | ~500Hz | 2.1 | 2.0 | 2.3 | 2.0 | 2.3 |
| | 500Hz~ | 3.2 | 2.6 | 3.1 | 2.6 | 3.1 |

FIG.8

| | Example 20 | Example 21 | Example 22 | Example 23 |
|---|---|---|---|---|
| First sound absorbing layer (A layer) | Regenerated pulp | Regenerated pulp | Regenerated pulp | Regenerated pulp |
| Surface density (kg/cm$^2$) | 2.0 | 2.0 | 2.0 | 2.0 |
| Second sound absorbing layer (B layer) | Regenerated pulp | PET nonwoven fabric | Felt | Cellular styrol |
| Surface density (kg/cm$^2$) | 1.0 | 1.0 | 1.0 | 0.3 |
| Sound insulating characteristic (average dB) ~500Hz | 3.6 | 3.4 | 2.8 | 2.2 |
| 500Hz~ | 5.2 | 5.1 | 4.8 | 4.2 |

FIG.9

| | | | Comparative example 11 | Example 28 | Example 29 | Example 30 | Example 31 | Example 32 | Example 33 | Example 34 | Example 35 |
|---|---|---|---|---|---|---|---|---|---|---|---|
| Sound absorbing layer | Natural fiber | Pulp | 20 | 20 | 20 | 20 | 20 | 20 | 20 | 20 | 20 |
| | | Regenerated pulp | — | — | — | — | — | — | — | — | — |
| | Synthetic resin | PP fiber | 80 | 80 | 80 | 80 | 80 | 80 | 80 | 80 | 80 |
| | | PET/PEI fiber | — | — | — | — | — | — | — | — | — |
| | Surface density (kg/cm²) | | 3.0 | 3.0 | 3.0 | 3.0 | 3.0 | 3.0 | 3.0 | 3.0 | 3.0 |
| Skin layer | PET span bond | | — | — | — | — | — | ○ | ○ | — | — |
| | PET nonwoven fabric | | — | ○ | ○ | ○ | ○ | — | — | — | — |
| | PP nonwoven fabric | | — | — | — | — | — | — | — | ○ | ○ |
| Surface density (kg/cm²) | | | — | 30.0 | 100.0 | 200.0 | 450.0 | 50.0 | 200.0 | 30.0 | 300.0 |
| Sound insulating characteristic (average dB) | ~500Hz | | 2.1 | 2.3 | 2.6 | 2.9 | 2.9 | 2.3 | 3.0 | 2.3 | 3.1 |
| | 500Hz~ | | 3.2 | 3.3 | 3.5 | 3.9 | 4.1 | 3.4 | 3.9 | 3.3 | 4.0 |

| | | | Comparative example 12 | Example 36 | Example 37 | Example 38 | Example 39 | Example 40 | Example 41 | Example 42 |
|---|---|---|---|---|---|---|---|---|---|---|
| Sound absorbing layer | Natural fiber | Pulp | 20 | 20 | 20 | 20 | 20 | 20 | 20 | 20 |
| | | Regenerated pulp | — | — | — | — | — | — | — | — |
| | Synthetic resin | PP fiber | 80 | 80 | 80 | 80 | 80 | 80 | 80 | 80 |
| | | PET/PEI fiber | — | — | — | — | — | — | — | — |
| | Surface density (kg/cm²) | | 3.0 | 3.0 | 3.0 | 3.0 | 3.0 | 3.0 | 3.0 | 3.0 |
| Skin layer | PET span bond | | — | ○ | ○ | ○ | ○ | ○ | — | — |
| | PET nonwoven fabric | | — | — | — | — | — | — | — | — |
| | PP nonwoven fabric | | — | — | — | — | — | — | ○ | ○ |
| Surface density (kg/cm²) | | | — | 30.0 | 100.0 | 200.0 | 50.0 | 200.0 | 50.0 | 200.0 |
| Sound insulating characteristic (average dB) | ~500Hz | | 2.3 | 2.4 | 2.7 | 3.1 | 2.5 | 3.3 | 2.4 | 3.1 |
| | 500Hz~ | | 3.0 | 3.2 | 3.4 | 3.8 | 3.3 | 4.0 | 3.3 | 3.7 |

SOUND ABSORBING-INSULATING STRUCTURE FOR VEHICLES

BACKGROUND OF THE INVNETION

1. Field of the Invention

The present invention relates to a sound absorbing-insulating structure, which absorbs and insulates noisy sound, for vehicles and, more particularly, a sound absorbing-insulating structure used as a dash insulator, a ceiling member, a floor insulator, a parcel board, various trims, etc. in the vehicle.

2. Description of the Related Art

In recent years, with the higher quality and the higher performance of the vehicle and the improvement in the consciousness of the urban environment, the requests for the silence in the interior and the noise on the outside of the vehicle become increasingly severe. As the sound absorbing-insulating parts employed currently in the vehicle, there are the hood insulator, the dash insulator, the head lining, the floor insulator, etc. In order to respond to the above requests, the sound absorbing-insulating parts are employed to extend up to the parcel board, the trunk trim, and the engine cover in addition to these parts.

Low cost has been required for the sound absorbing-insulating material for the vehicle. For this reason, mainly the inorganic fiber such as the fiber felt, the rock wool, the glass wool, etc., the foam such as urethane, polyphenylene oxide/polystyrene alloy, etc., the corrugated fiberboard, or their combination is employed as the sound absorbing-insulating material. These sound absorbing-insulating materials are inexpensive in cost, but it is impossible to say that they are always excellent in the sound absorbing performance.

SUMMARY OF THE INVNETION

In order to improve the sound insulating characteristic, weight or thickness of the sound absorbing material has been increased. However, this method is contradictory to the reduction in the vehicle weight that is requested from the viewpoints of the improvement of the fuel efficiency and the emission regulation. Therefore, In order to overcome these problems, the sound absorbing-insulating material employing the nonwoven fabric of polyester fibers has been developed (Japanese Patent Application Publications Hei 5-181486 (published in 1993), Hei 6-170997(published in 1994), and Hei 7-223478). But the subject still remains in a respect of the reduction in cost.

It is an object of the present invention to provide a sound absorbing-insulating structure for vehicles, that has the good sound absorbing characteristic and is light in weight and inexpensive in cost.

In order to achieve this object, an aspect of this invention is that a sound absorbing-insulating structure has a sound absorbing layer which contains cellulose fibers and synthetic resin as principal components. Also, it is preferable that a content rate of the synthetic resin should be set to 0.01 to 80 wt % and that a surface density should be set to 0.2 to 3 $kg/m^2$. Here, the surface density means weight per unit are.

The cellulose fibers that have the high sound absorbing effect and the synthetic resin that has the adhesiveness and the high shape plastic effect can be mixed together, and also an amount of the synthetic resin and the surface density of the sound absorbing layer can be suppressed. Therefore, the sound absorbing-insulating structure can provide the high sound absorbing characteristic in low cost and lightweight.

BRIEF DESCRIPTION OF THE DRAWINGS

FIGS. 1A to 1D show sectional shapes of a sound absorbing layer of a sound absorbing-insulating structure according to an embodiment of the present invention, wherein

DETAILED DESCRIPTION OF THE EMBODIMENT

A sound absorbing-insulating structure for vehicles according to an embodiment of the present invention has a sound absorbing layer that contains cellulose fibers which is a kind of natural fiber and a synthetic resin as principal components. This sound absorbing layer mainly has a sound absorbing function, however, it also has sound insulating function.

The fibrous composition has a good sound absorbing effect. In particular, the cellulose fiber has an excellent sound absorbing function based on its shape of the fiber of which the diameter is fine. It is also possible to get a fine shaped synthetic fiber. But, if the cellulose fibers are employed, the material cost can be saved more inexpensively. In addition, the natural fibers as cellulose fibers have an uneven modified cross sections unlike a circular cross section of the synthetic fiber, and the uneven shape can improve sound absorbing characteristic.

Here there can be listed the pulp fibers (cellulose derivative), cotton yarn, etc. as the cellulose fibers. The pulp fibers may be obtained from regenerated waste paper. If the regenerated waste paper is used as material for the pulp fibers, the material cost can be reduced much more considerably. In this case, these cellulose fibers may be employed with other material.

In contrast, since the synthetic fiber has the adhesive function, the sound absorbing layer can be shaped in a desired shape if the synthetic fiber is mixed with the cellulose fibers. Also, in order to give the moldability, it is desired that the synthetic resin component should be formed of the thermoplastic resin or the thermoplastic resin fiber. In this case, it is desired that a content rate of the synthetic resin should be set in a range of 0.01 to 80 wt %. If the content rate of the synthetic resin in this sound absorbing layer is less than 0.01 wt %, the structure of the sound absorbing layer becomes fragile and thus the shape crumbles in handling. Conversely, if the content rate of the synthetic resin is in excess of 80 wt %, the shape holding effect and the rigidity improving effect are saturated and thus the increase of the synthetic resin composition to exceed such value is not economical. As a result, it is preferable that the content rate of the synthetic resin should be set to 0.01 to 80 wt %.

It is desired that the surface density should be set in a range of 0.2 to 3.0 kg/m$^2$. The sound absorbing effect becomes insufficient if the surface density of the sound absorbing layer is less than 0.2 kg/m$^2$, whereas the sound absorbing effect is saturated if the surface density of the sound absorbing layer is more than 3.0 kg/m$^2$. Therefore, it is desired from viewpoints of the weight reduction and the economical efficiency that the surface density should be set to 0.2 to 3.0 kg/m$^2$.

Also, it is desired that the synthetic fiber having core-sheath structure consisting of a core portion and a sheath portion surrounding the core portion should be employed as the synthetic resin. In this case, it is preferable that the melting point of the core portion should be set sufficiently higher than that of the sheath portion. Thus, the adhesive effect can be obtained by selectively melting the sheath portion, and also the sound absorbing characteristic can be improved by leaving the core portion such that the fibrous synthetic resin is left in the sound absorbing layer.

If the difference in the melting point between the core portion and the sheath portion is smaller than 20° C., it is difficult to melt the sheath portion only because of the variation of the temperature distribution caused when the hot air heating furnace is employed in the product step. The type of the synthetic fiber is not particularly limited, but polyester fibers such as polyethylene terephthalate, polybutylene terephthalate, polybutylene isophthalate, etc., which are normally employed and at a relatively low cost, are preferable.

If the synthetic fiber is employed as the synthetic resin, such synthetic fiber is ready to become tangled with the natural fiber rather than the case where the granular synthetic fiber is employed, and thus the adhesive effect can be achieved by a small amount of the synthetic fiber. As a result, an amount of the synthetic resin can be suppressed, and also the material cost of the synthetic resin can be lowered.

In addition, it is desired that the melting point of the synthetic resin should be set to less than or equal to 200° C. to reduce the burden on the manufacturing equipment and to use conventional equipment. If the synthetic resin having the core-sheath structure is employed, it is desired that the melting point of the sheath portion should be set to less than or equal to 200° C.

For example, as the thermoplastic resin or the thermoplastic resin fiber whose melting point is less than or equal to 200° C., resin powder, emulsion, completely melted fiber, etc. may be listed.

Figure 1A:
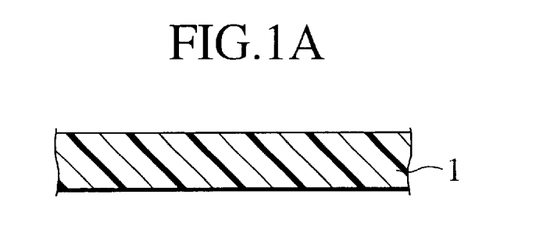
FIG. 1A shows an example of a single-layered sound absorbing layer containing cellulose fibers and a synthetic resin as principal components.
Figure 1B:
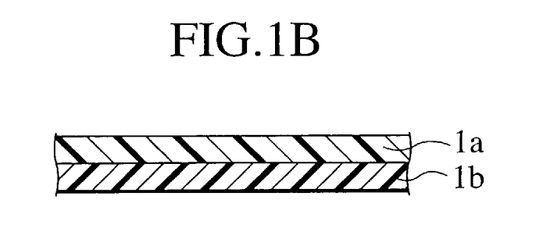
FIG. 1B shows an example of a double-layered sound absorbing layer constructed by laminating sound absorbing layers 1a, 1b that have different density and composition ratios and contain the cellulose fibers and the synthetic resin as principal components.

The sound absorbing-insulating structure according to the embodiment may have only a single layer of the sound absorbing layer 1 described in the above embodiment, as shown in FIG. 1A. Also, the sound absorbing-insulating structure may contain a plurality of the sound absorbing layers 1a, 1b, . . . described in the above embodiment, as shown in FIG. 1B. For example, the composition ratio and the density of respective sound absorbing layers may be changed every layer.

Figure 1C:
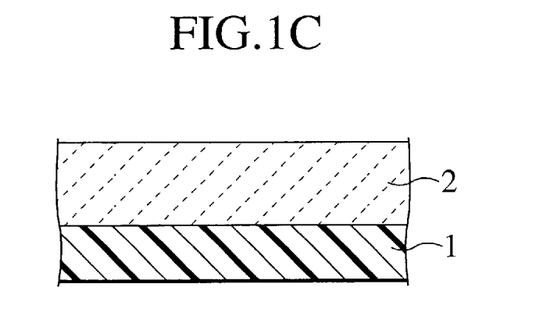
FIG. 1C shows an example in which a sound absorbing layer having another composition is laminated on the sound absorbing layer in FIG. 1A.

In addition, the structure in which another sound absorbing layer 2 formed of synthetic fiber nonwoven fabric, felt, or resin foam is laminated on the above sound absorbing layer 1 is employed, as shown in FIG. 1C, the sound insulating effect can be enhanced. Otherwise, if the hollow structure or the honeycomb structure is contained in a part of the sound absorbing-insulating structure, the reduction in the total weight can be achieved.

Figure 1D:
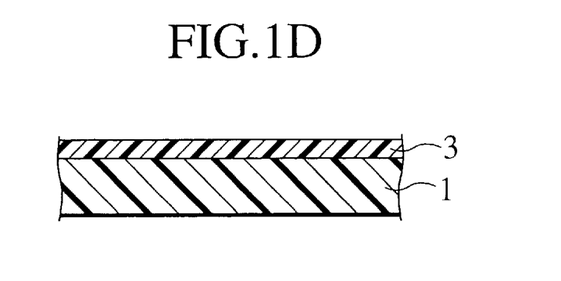
FIG. 1D shows an example in which a sound absorbing layer having a skin layer is laminated on the sound absorbing layer in FIG. 1A.

Also, if a lightweight skin layer 3 is laminated on the above sound absorbing layer, as shown in FIG. 1D, the sound absorbing-insulating structure can exhibit the excellent sound insulating performance. Therefore, the sound absorbing-insulating structure for vehicles may contain the skin layer formed integrally with the sound absorbing layer. In this case, it is preferable that the surface density of the skin layer should be set in a range of 30 to 500 g/cm$^3$.

If the surface density is less than 30 g/cm$^3$, the improvement in the sound insulating effect cannot be found rather than the case the single-layered sound absorbing layer is formed. In contrast, if the surface density is more than 500 g/cm$^3$, the weight becomes too heavy. In order to satisfy the good balance between the weight, the cost, and the sound insulating performance, the surface density may be set to almost 80 to 200 g/cm$^3$, but this value is not intended to limit particularly the present invention. If the skin layer is laminated on the sound absorbing layer, the laminated skin layer has a role to prevent raising dust or fibrous dust from the sound absorbing layer.

The nonwoven fabric containing essentially of the fiber that satisfy the above condtions is optimum as the skin layer. The nonwoven fabric containing continuous fibers as the principal components is normally called a span bond, and has the merit such that it can be easily handled because of the lightweight and the high strength. The synthetic fiber such as polyester, polyamide, or polypropylene is suitable for the material.

The above sound absorbing-insulating structure in which the sound absorbing layer is formed integrally with the skin layer can be employed preferably as the interior member of a vehicle.

In addition, the sound absorbing-insulating structure according to the present embodiments may include a flame retardant, an insecticide, an antiseptic, a water repellant agent, a ground waste paper, etc.

As explained above, the sound absorbing-insulating structure in which the skin layer is laminated on the single-layered or plural-layered sound absorbing layer, that contains the cellulose fibers and the synthetic resin as the principal components, has the features that such structure is light in weight, is inexpensive in cost, and is excellent in the sound absorbing-insulating characteristic.

Also, if the sound absorbing-insulating structure according to the embodiment is employed as the interior material such as a dash insulator, a head lining (ceiling member), a floor insulator, a parcel board, a door trim, a pillar trim, a trunk trim, etc. provided to the car body or the exterior material such as an engine cover, an under cover, a hood insulator, etc., the sound absorbing-insulating performance of the vehicle can be improved much more. Therefore, the sound absorbing-insulating structure according to the embodiment can achieve the excellent effect such that the improvement of the silence in the interior and the reduction in the noise of the outside of the vehicle can be attained. In addition, the sound absorbing-insulating structure according to the embodiment can contribute to the higher quality and the higher performance of the vehicle and the improvement in the consciousness of the urban environment.

Figure 2:
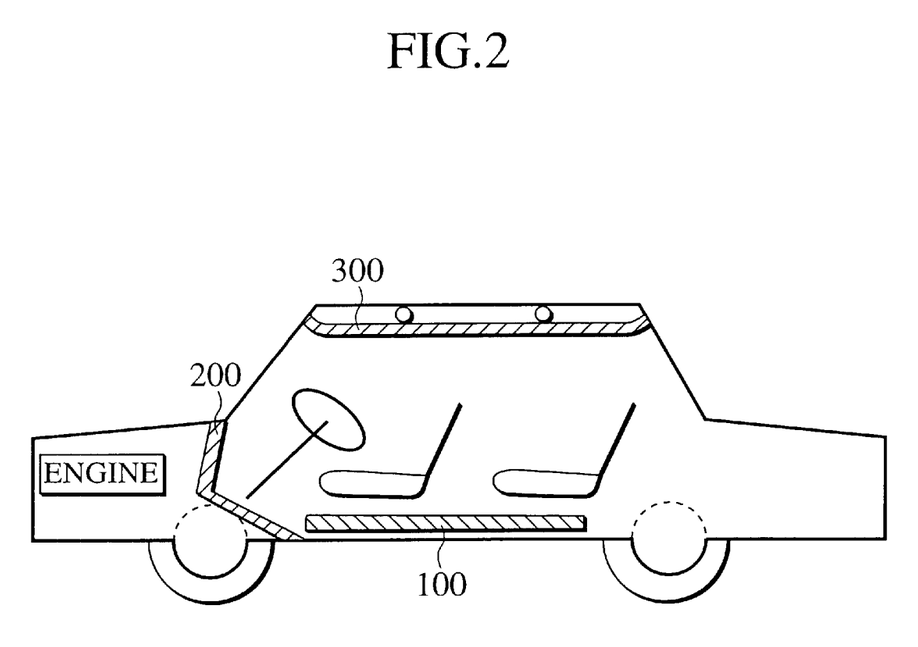
FIG. 2 shows positions of a ceiling member, a carpet, and a dash insulator provided to the car body.

FIG. 2 shows positions of the ceiling member 300, the carpet, the dash insulator 200 and the floor insulator 100 provided to the car body.

Figure 3:
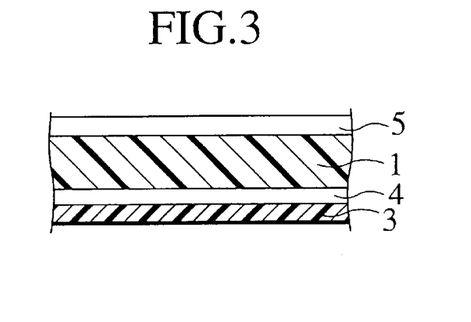
FIG. 3 shows a cross section of the ceiling member employing the sound absorbing-insulating structure according to the embodiment of the present invention.

FIG. 3 shows an example of a sectional structure of the ceiling member employing the sound absorbing-insulating structure according to the embodiment. The skin layer 3 is formed on one surface of the sound absorbing layer 1 via an adhesive layer 4. Also, a film having a vent preventing function is formed on the other surface of the sound absorbing layer 1.

Figure 4:
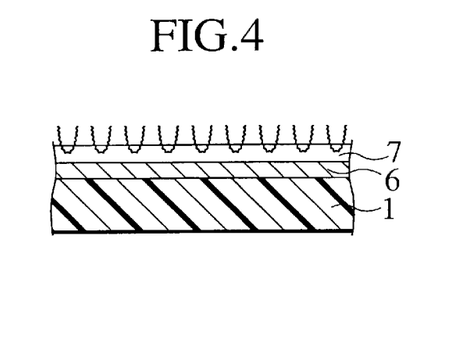
FIG. 4 shows a cross section of the carpet having the sound absorbing-insulating structure according to the embodiment of the present invention.

Also, FIG. 4 shows an example of a sectional structure of a carpet to which the sound absorbing-insulating structure according to the embodiment is applied. A backing layer 6 is formed on the sound absorbing layer 1 and then a carpet layer 7 is formed on the backing layer 6.

Figure 5:
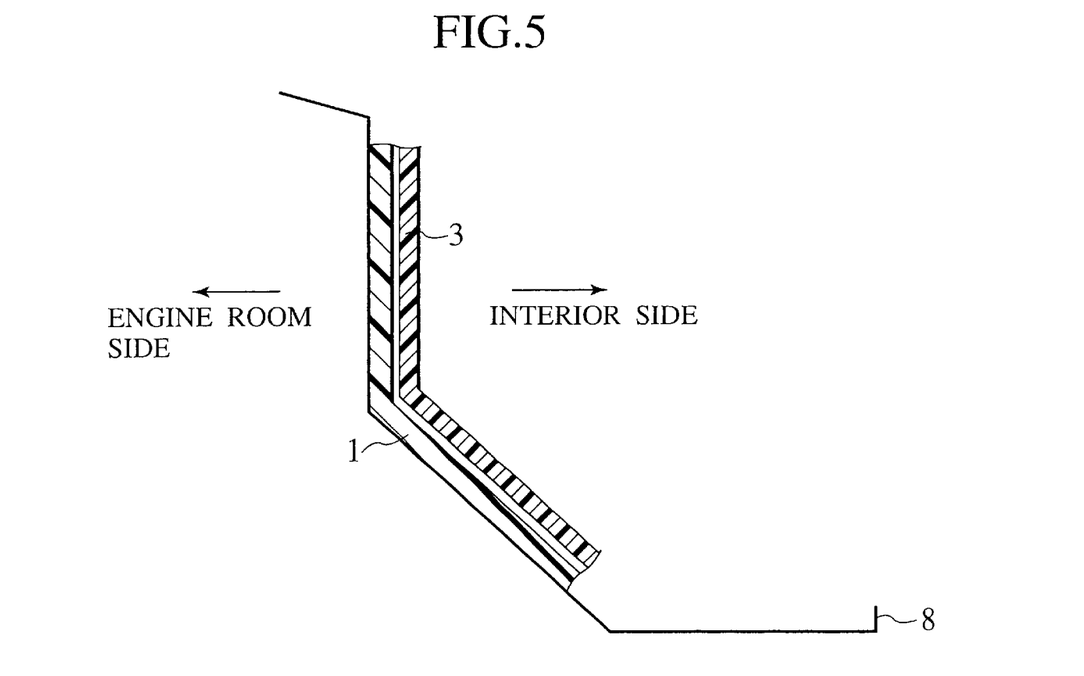
FIG. 5 shows a cross section of the dash insulator employing the sound absorbing-insulating structure according to the embodiment of the present invention.
Figure 6:
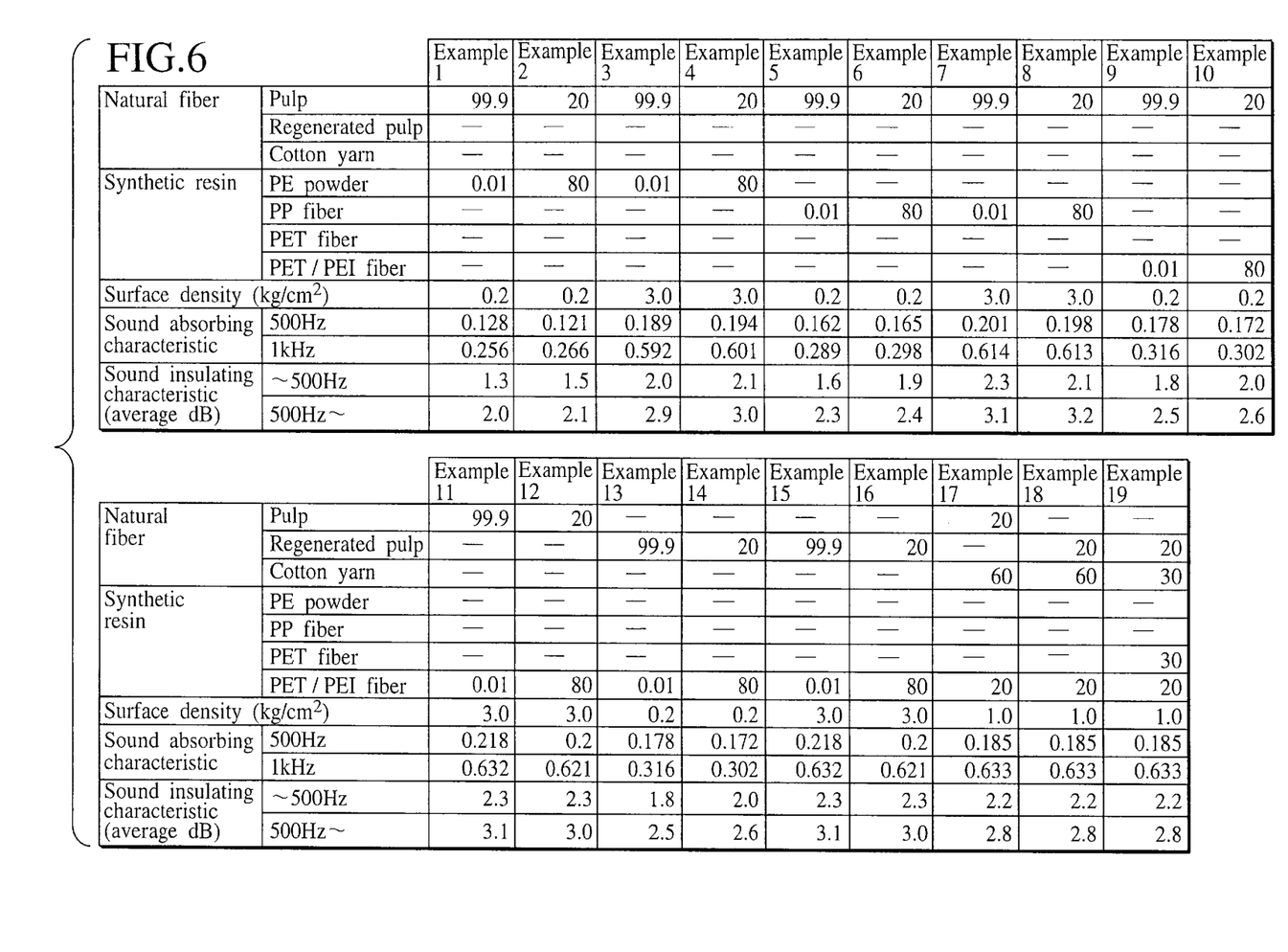
FIG. 6 is a Table showing material, a surface density, a sound absorbing characteristic and a sound insulating characteristic of the sound absorbing-insulating structures having single-layered sound absorbing layers according to Examples 1 to 19 of the present invention.
Figure 7:
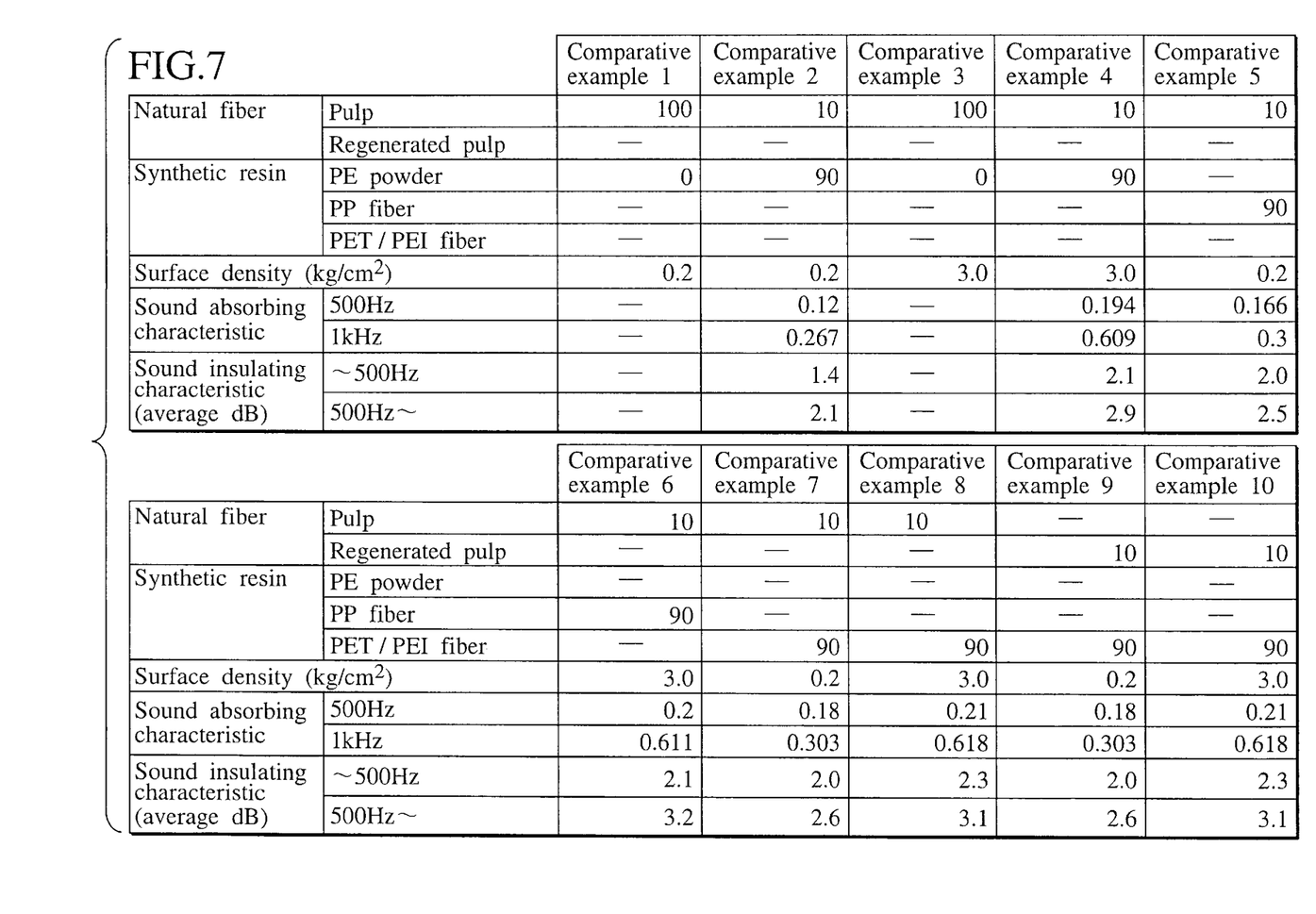
FIG. 7 is a Table showing material, a surface density, a sound absorbing characteristic and a sound insulating characteristic of the sound absorbing-insulating structures having single-layered sound absorbing layers according to Comparative Examples 1 to 10 of the present invention.
Figure 8:
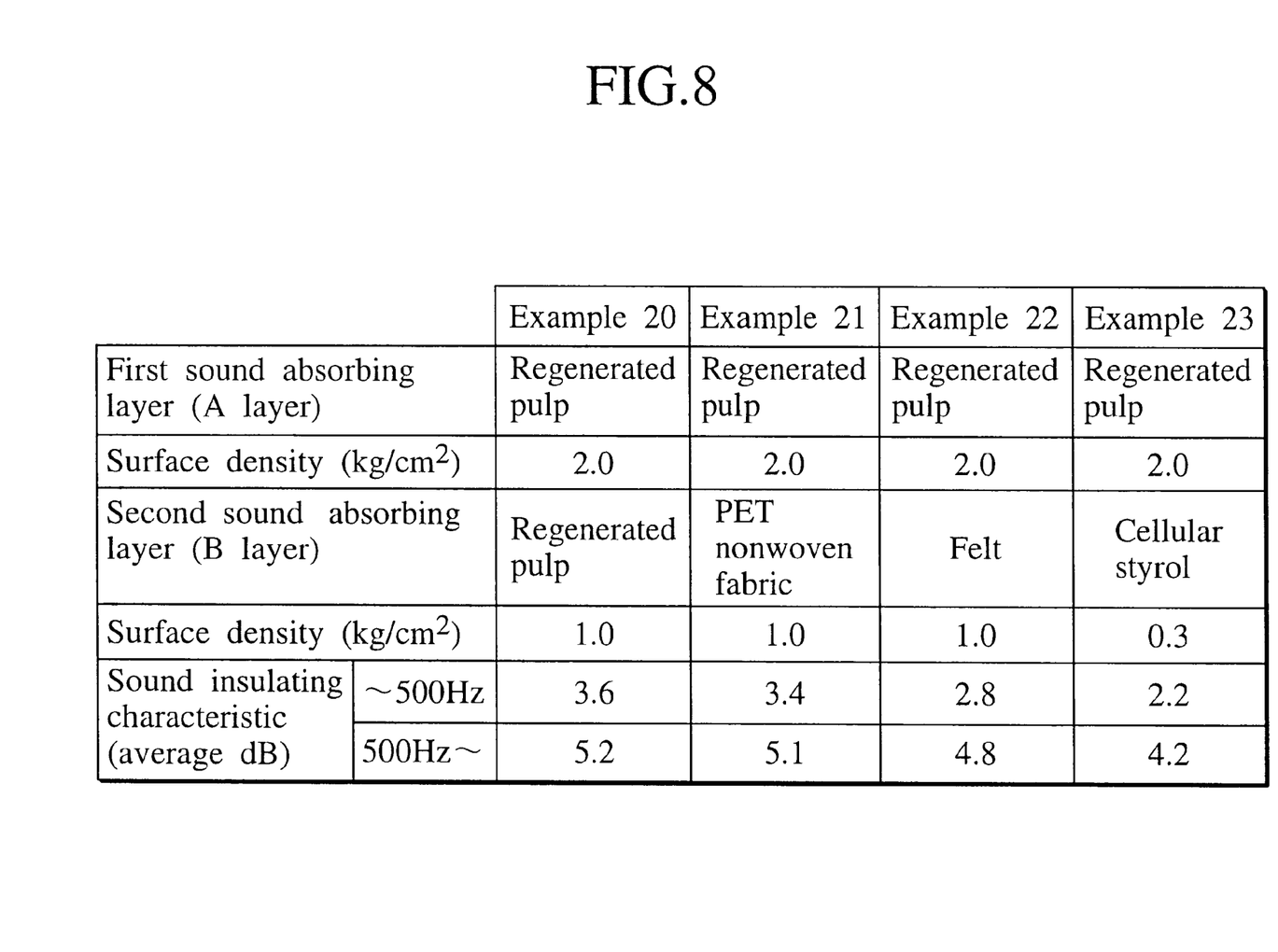
FIG. 8 is a Table showing material, a surface density, a sound absorbing characteristic and a sound insulating characteristic of the sound absorbing-insulating structures having double-layered sound absorbing layers according to Examples 20 to 23 of the present invention.
Figure 9:
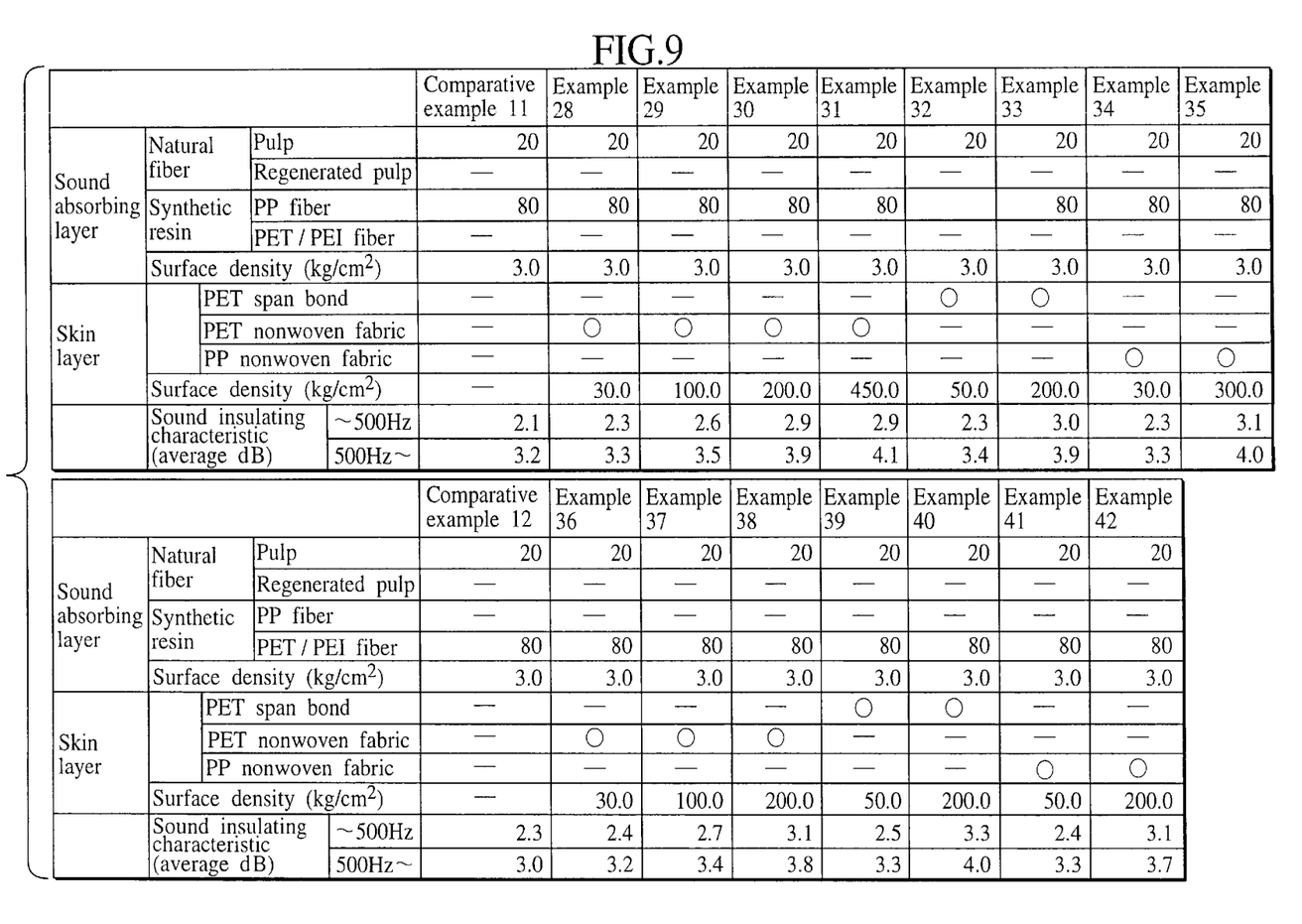
FIG. 9 is a Table showing material, a surface density, and a sound insulating characteristic of the sound absorbing-insulating structures having a sound absorbing layers and a skin layer according to Examples 28 to 42 of the present invention.

Then, FIG. 5 is a view showing the dash insulator to which the sound absorbing-insulating structure according to the embodiment is applied. The sound absorbing layer 1 is provided on one side surface of the a body panel 8 that partitions the engine room and the compartment, and the skin layer 3 is provided on the sound absorbing layer 1 directly or via an adhesive layer, or the like. The noise generated in the engine room is absorbed by the sound absorbing layer 1 and then insulated by the skin layer 3.

EXAMPLES

Example 1

A plate-like product of Example 1 whose surface density is 0.2 kg/m$^2$ was manufactured by distributing pulp fibers of 99.9 wt % as the natural fibers and polyethylene (referred to as "PE" hereinafter) fiber of 0.01 wt % as the synthetic resin into water, and then thermally pressing the sheet-like product obtained by dipping up the distributed pulp fibers from the water. A test piece that is cut out from this plate-like product was evaluated.

Examples 2 to 4

Plate-like products of Examples 2 to 4 were manufactured by using similar ways to Example 1, except that the pulp fibers of 20 %, 99.9 wt %, and 20 wt % were employed as the natural fibers respectively and the PE fibers of 80 wt %, 0.01 wt %, and 80 wt % are employed as the synthetic resin respectively and surface-densities were set to 0.2 kg/m$^2$, 3.0 kg/m$^2$, and 3.0 kg/m$^2$ respectively. Test pieces that are cut out from this plate-like product were evaluated.

Example 5

A plate-like product of Example 5 whose surface density is 0.2 kg/m$^2$ was manufactured by distributing pulp fibers of 99.9 wt % as the natural fibers and polypropylene (referred to as "PP" hereinafter) powder of 0.01 wt % as the synthetic resin into water, and then thermally pressing a sheet-like product obtained by dipping up the distributed pulp fibers from the water. A test piece that is cut out from this plate-like product was evaluated.

Examples 6 to 8

Plate-like products of Examples 6 to 8 were manufactured in the similar way to Example 5, except that the pulp fibers of 20 wt %, 99.9 wt %, and 20 wt % were employed as the natural fibers respectively and the PP fibers of 0.01 wt %, 80 wt %, and 0.01 wt % are employed as the synthetic resin respectively and the surface densities were set to 0.2 kg/m$^2$, 0.2 kg/m$^2$, and 3.0 kg/m$^2$ respectively. Test pieces that are cut out from this plate- like product were evaluated.

Example 9

A plate-like product of Example 9 whose surface density is 0.2 kg/m$^2$ was manufactured by distributing pulp fibers of 99.9 wt % as the natural fibers and core-sheath fibers of 0.01 wt %, that consist of the sheath portion made of polyethylene terephthalate (referred to as "PET" hereinafter) and the core portion made of polyethylene isophthalate (referred to as "PEI" hereinafter), as the synthetic resin into water, and then thermally pressing the sheet-like product obtained by dipping up the distributed pulp fibers from the water. A test piece that is cut out from this plate-like product was evaluated.

Examples 10 to 12

Plate-like products of Examples 10 to 12 were manufactured in the similar way to Example 9, except that the pulp fibers of 20 wt %, 99.9 wt %, and 20 wt % were employed as the natural fibers respectively and the core-sheath fibers made of PET and PEI of 0.2 wt %, 3.0 wt %, and 3.0 wt % are employed as the synthetic resin respectively and the surface densities were set to 0.2 kg/m$^2$, 0.2 kg/m$^2$, and 3.0 kg/m$^2$ respectively. Test pieces that are cut out from this plate-like product were evaluated.

Example 13

A plate-like product of Example 13 whose surface density is 0.2 kg/m$^2$ was manufactured by distributing waste paper regenerated pulp fibers of 99.9 wt % as the natural fibers and core-sheath fibers of 0.01 wt % made of PET and PEI as the synthetic resin into water, and then thermally pressing the sheet-like product obtained by dipping up the distributed pulp fibers from the water. A test piece that is cut out from this plate-like product was evaluated.

Examples 14 to 16

Plate-like products of Examples 14 to 16 were manufactured in the similar way to Example 13, except that the waste paper regenerated pulp fibers of 20 wt %, 99.9 wt %, and 20 wt % were employed as the natural fibers respectively and the core-sheath fibers made of PET and PEI of 80 wt %, 0.01 wt %, and 80 wt % were employed as the synthetic resin respectively and that the surface densities are set to 0.2 kg/m$^2$, 3.0 kg/m$^2$, and 3.0 kg/m$^2$ respectively. Test pieces that are cut out from this plate-like product were evaluated.

Example 17

A plate-like product of Example 17 whose surface density is 1.0 kg/m$^2$ was manufactured by distributing cotton yarn of 60 wt % and pulp fibers of 20 wt % as the natural fibers and core-sheath fibers of 20 wt % made of PET and PEI as the synthetic resin into water, and then thermally pressing the sheet-like product obtained by dipping up the distributed pulp fibers from the water. A test piece that is cut out from this plate-like product was evaluated.

Example 18

A plate-like product of Example 18 was manufactured in the similar way to Example 17, except that the cotton yarn of 60 wt % and the regenerated pulp fibers of 20 wt % were employed as the natural fibers. A test piece that is cut out from this plate-like product was evaluated.

Example 19

A plate-like product of Example 19 was manufactured in the similar way to Example 17, except that, the cotton yarn of 30 wt % and the regenerated pulp fibers of 20 wt % were employed as the natural fibers. A test piece that is cut out from this plate-like product was evaluated.

Example 20

A plate-like product of Example 20 was manufactured by distributing waste-paper regenerated pulp fibers of 80 wt % as the natural fibers and core-sheath fibers of 20 wt % made of PET and PEI as the synthetic resin into water, dipping up a sheet-like first sound absorbing layer (A layer) whose surface density is 1.0 kg/m$^2$ and a sheet-like second absorbing layer (B layer) whose surface density is 2.0 kg/m$^2$ product, laminating the B layer on the A layer, and then thermally pressing the A and B layers. A test piece that is cut out from this plate-like product was evaluated.

Example 21

A plate-like product of Example 21 was manufactured in the similar way to Example 20, except that the A layer was a sheet-like one whose surface density is 2.0 kg/m$^2$ and the B layer was a PET nonwoven fabric layer whose surface density is 1.0 kg/m$^2$. A test piece that is cut out from this plate-like product was evaluated.

Example 22

A plate-like product of Example 22 was manufactured in the similar way to Example 20, except that the A layer was sheet-like one whose surface density is 2.0 kg/m$^2$ and the B layer was a felt whose surface density is 1.0 kg/m$^2$. A test piece that is cut out from this plate-like product was evaluated.

Example 23

A plate-like product of Example 23 was manufactured in the similar way to Example 20, except that the A layer was sheet-like one whose surface density is 2.0 kg/m$^2$ and the B layer was a cellular styrol whose surface density is 0.3 kg/m$^2$. A test piece that is cut out from this plate-like product was evaluated.

Example 24

A ceiling member for vehicles of Example 24 was fabricated by distributing waste-paper regenerated pulp fibers of 80 wt % as the natural fibers and core-sheath fibers of 20 wt % made of PET and PEI as the synthetic resin into water, dipping up a sheet-like first sound absorbing layer (A layer) whose surface density is 1.0 kg/m$^2$ from the water, then thermally pressing integrally the A layer and a nonwoven fabric skin layer (C layer)

This ceiling member was evaluated comparing with a ceiling member having the felt insulator in the prior art by applying to the vehicle sensory analysis. As a result a good characteristic of the ceiling member of Example 24 was confirmed.

Example 25

A dash insulator for vehicles of Example 25 was fabricated by distributing waste-paper regenerated pulp fibers of 80 wt % as the natural fibers and core-sheath fibers of 20 wt % made of PET and PEI as the synthetic resin into water, dipping up a sheet-like first absorbing layer (A layer) whose surface density is 1.25 kg/m$^2$ from the water, then thermally pressing integrally the A layer and a rubber skin layer (C layer).

This dash insulator was evaluated comparing with a dash insulator having the felt insulator in the prior art by applying to the vehicle sensory analysis. As a result a good characteristic of the dash insulator of Example 25 was confirmed.

Example 26

A carpet for vehicles of Example 26 was fabricated by distributing waste-paper regenerated pulp fibers of 80 wt % as the natural fibers and core-sheath fibers of 20 wt % made of PET and PEI as the synthetic resin into water, dipping up a sheet-like first absorbing layer (A layer) whose surface density is 1.25 kg/m$^2$ from the water, then thermally pressing integrally the A layer and a carpet skin layer (C layer).

This carpet was evaluated comparing with a carpet having a felt insulator in the prior art by applying to the vehicle sensory analysis. As a result a good characteristic of the carpet of Example 26 was confirmed.

Example 27

A dash insulator for vehicles of Example 27 was fabricated by distributing waste-paper regenerated pulp fibers of 80 wt % as the natural fibers and core-sheath fibers of 20 wt % made of PET and PEI as the synthetic resin into water, dipping up a sheet-like first absorbing layer (A layer) whose surface density is 2.0 kg/m$^2$ from the water, then thermally pressing integrally the A layer and a PET nonwoven fabric layer (C layer).

This dash insulator was evaluated comparing with a dash insulator having the felt insulator in the prior art by applying to the vehicle sensory analysis. As a result a good characteristic of the dash insulator of Example 27 was confirmed.

Examples 28 to 35

Plate-like products of Examples 28 to 35 were manufactured by laminating the nonwoven fabric made of the PET fibers (PET nonwoven fabric), the nonwoven fabric made of the PET continuous fibers (span bond), and the nonwoven fabric made of the PP (polypropylene) fibers (C layer), whose surface densities are changed respectively, onto the sample fabricated in Comparative Example 11. Test pieces that are cut out from this plate-like product were evaluated.

Examples 36 to 42

Plate-like products of Examples 36 to 42 were manufactured by laminating the nonwoven fabric made of the PET fibers (PET nonwoven fabric), the nonwoven fabric made of the PET continuous fibers (span bond), and the nonwoven fabric made of the PP (polypropylene) fibers (C layer), whose surface densities are changed respectively, onto the sample fabricated in Comparative Example 12. Test pieces that are cut out from this plate-like product were evaluated.

Comparative Example 1

A plate-like product of Comparative Example 1 whose surface density is 0.2 kg/m² was manufactured by distributing pulp fibers of 100 wt % as the natural fibers into water, dipping up a sheet-like product from the water, and then thermally pressing the sheet-like product. This plate-like product that does not contain the synthetic resin was destroyed in handling, and thus was not able to be evaluated.

Comparative Examples 2 to 4

Plate-like products of Comparative Examples 2 to 4 were manufactured in the similar way to Example 1, except that the pulp fibers of 10 wt %, 100 wt %, and 10 wt % are employed as the natural fibers respectively, the PE powder of 90 wt %, 0 wt %, and 90 wt % were employed as the synthetic resin respectively, and that the surface densities were set to 0.2 kg/m², 3.0 kg/m², and 3.0 kg/m² respectively. Test pieces that are cut out from this plate-like product were evaluated. But the plate-like product in Comparative Example 3 was destroyed in handling, and thus was not able to be evaluated.

Comparative Examples 5, 6

Plate-like products of Comparative Examples 5, 6 were manufactured in the similar way to Example 5, except that the pulp fibers of 10 wt % were employed respectively as the natural fibers, the PE fibers of 90 wt % were employed respectively as the synthetic resin, and the surface densities were set to 0.2 kg/m² and 3.0 kg/m² respectively. Test pieces that are cut out from this plate-like product were evaluated.

Comparative Examples 7, 8

Plate-like products of Comparative Examples 7, 8 were manufactured in the similar way to Example 9, except that the pulp fibers of 10 wt % were employed respectively as the natural fibers, the core-sheath fibers of 90 wt % and made of PET and PEI were employed respectively as the synthetic resin, and the surface densities were set to 0.2 kg/m² and 3.0 kg/m² respectively. Test pieces that are cut out from this plate-like product were evaluated.

Comparative Examples 9, 10

Plate-like products of Comparative Examples 9, 10 were manufactured in the similar way to Example 13, except that the waste-paper regenerated pulp fibers of 10 wt % were employed respectively as the natural fibers, the core-sheath fibers of 90 wt % and made of PET and PEI were employed respectively as the synthetic resin, and the surface densities were set to 0.2 kg/m² and 3.0 kg/m² respectively. Test pieces that are cut out from this plate-like product were evaluated.

Comparative Example 11

A plate-like product of Comparative Example 11 whose surface density is 3.0 kg/m² was manufactured by distributing pulp fibers of 20 wt % and PP fibers of 80 wt % into water, dipping up a sheet-like product from the water and then thermally pressing the sheet-like product. A test piece that is cut out from this plate-like product was evaluated.

Comparative Example 12

A plate-like product of Comparative Example 12 whose surface density is 3.0 kg/m² was manufactured by distributing pulp fibers of 20 wt % and PET/PEI core-sheath fibers, whose sheath is made of PET, of 80 wt % into water, dipping up a sheet-like product from the water and then thermally pressing the sheet-like product. A test piece that is cut out from this plate-like product was evaluated.

(Evaluation Methods)

In the examples, the measurements were made according to the following methods.

(1) Sound absorption Measurement

The measurement was made in compliance with JIS A1405 "the measurement of the vertically incident sound into the construction material by the in-tube method". The sample having the size of F 100 was employed in the measurement, and the measurement was carried out in the measuring range of 125 to 1600 Hz. The higher the numerical values, the better the sound absorbing characteristic.

(2) Sound insulation Measurement

The measurement was made in compliance with JIS A1416 "the measuring method of the sound transmission loss in the laboratory". The simple reverberation box was employed. Measured results were displayed as the difference of the sound insulating performance from the PET nonwoven fabric having the same surface density and the same thickness. That is, if the value is higher than 0 dB, the sound insulating characteristic is higher than the prior art product. This difference was averaged by the low frequency (less than 500 Hz) and the high frequency (more than 500 Hz).

(3) Vehicle sensory Evaluation

After the objective part of the parts for vehicles obtained in Examples 24 to 27 was fitted to the actual vehicle, it was evaluated by several panelists whether or not they feel "quiet" during the running on the predetermined course. The objective parts in respective Examples were relatively evaluated by fitting the objective parts sequentially to the same vehicle.

When the evaluation was carried out based on three evaluation standards, i.e., 1): improved, 2): same, 3): worsened, the good results of "improved" were obtained in all Examples 24 to 27.

The measured results obtained in Examples 1 to 23, 28 to 42 and Comparative Examples 1 to 12 are given in Tables shown in FIGS. 6 to 9.

The entire contents of Japanese Patent Application P2000-255234 (filed Aug. 25, 2000) are incorporated herein by reference.

Although the inventions have been described above by reference to certain embodiments of the inventions, the inventions are not limited to the embodiments described above. Modifications and variations of the embodiments descried above will occur to those skilled in the art, in light of the above teachings.

The scope of the inventions is defined with reference to the following claims.

What is claimed is:

1. A sound absorbing-insulating structure for vehicles, comprising:
   a sound absorbing layer which contains cellulose fibers and synthetic resin as principal components and whose surface density is 0.2 to 3 kg/m², a content rate of the synthetic resin being 0.01 to 80 wt %,
   wherein the cellulose fibers are one of pulp fibers or cotton yarn, and
   wherein the pulp fibers are obtained from regenerated waste paper.

2. A sound absorbing-insulating structure for vehicles, comprising:
   a sound absorbing layer which contains cellulose fibers and synthetic resin as principal components and whose surface density is 0.2 to 3 kg/m$^2$, a content rate of the synthetic resin being 0.01 to 80 wt %,
   wherein the synthetic resin is thermoplastic resin or thermoplastic resin fiber whose melting point is less than or equal to 200° C.

3. A sound absorbing-insulating structure for vehicles, comprising:
   a sound absorbing layer which contains cellulose fibers and synthetic resin as principal components and whose surface density is 0.2 to 3 kg/m$^2$, a content rate of the synthetic resin being 0.01 to 80 wt %,
   wherein the synthetic resin has a structure comprising a core portion and a sheath portion for surrounding the core, a melting point of the sheath portion is less than or equal to 200° C., and a difference in the melting point between the core portion and the sheath portion is more than or equal to 20° C.

4. The sound absorbing-insulating structure for vehicles according to claim 3, wherein the sound absorbing layer comprises at least two layers which have different surface densities.

5. The sound absorbing-insulating structure for vehicles according to claim 3, further comprising:
   another layer containing PET nonwoven fabric, felt, or resin foam.

6. The sound absorbing-insulating structure for vehicles according to claim 3, further comprising:
   a skin layer formed integrally with the sound absorbing layer.

7. The sound absorbing-insulating structure for vehicles according to claim 6, wherein the skin layer has the surface density of 30 to 500 g/m$^2$.

8. The sound absorbing-insulating structure for vehicles according to claim 6, wherein the skin layer comprises synthetic resin as a principal component.

9. The sound absorbing-insulating structure for vehicles according to claim 6, wherein synthetic resin that has continuous fibers each having a length of more than or equal to 100 mm as a principal component is employed as the skin layer.

10. The sound absorbing-insulating structure for vehicles according to claim 3, wherein the sound absorbing-insulating structure for vehicles constitutes any one selected from the group consisting of a dash insulator, a ceiling member, a floor insulator, a parcel board, a carpet, a hood insulator, a trunk trim, a door trim, a pillar trim, an engine cover, and an under cover.

11. The sound absorbing-insulating structure for vehicles according to claim 6, wherein the sound absorbing-insulating structure for vehicles constitutes any one selected from the group consisting of a dash insulator, a ceiling member, a floor insulator, a parcel board, a carpet, a hood insulator, a trunk trim, a door trim, a pillar trim, an engine cover, and an under cover.

12. A dash insulator for vehicles, comprising:
    the sound absorbing-insulating structure set forth in claim 3.

13. A ceiling member for vehicles, comprising:
    the sound absorbing-insulating structure set forth in claim 3.

14. A carpet for vehicles, comprising:
    the sound absorbing-insulating structure set forth in claim 3.

15. The sound absorbing-insulating structure for vehicles according to claim 3, wherein the cellulose fibers are pulp fibers or cotton yarn.

16. The sound absorbing-insulating structure for vehicles according to claim 15, wherein the pulp fibers are obtained from regenerated waste paper.

17. The sound absorbing-insulating structure for vehicles according to claim 3, wherein the synthetic resin is thermoplastic resin or thermoplastic resin fiber whose melting point is less than or equal to 200° C.

* * * * *